US009446957B2

(12) United States Patent
Sofin et al.

(10) Patent No.: US 9,446,957 B2
(45) Date of Patent: Sep. 20, 2016

(54) POLYCRYSTALLINE SILICON ROD AND METHOD FOR PRODUCING POLYSILICON

(71) Applicant: Wacker Chemie AG, Munich (DE)

(72) Inventors: Mikhail Sofin, Burghausen (DE); Erich Dornberger, Burhausen (DE); Reiner Pech, Neuoetting (DE)

(73) Assignee: WACKER CHEMIE AG, Munich (DE)

( * ) Notice: Subject to any disclaimer, the term of this patent is extended or adjusted under 35 U.S.C. 154(b) by 130 days.

(21) Appl. No.: 14/362,781

(22) PCT Filed: Dec. 12, 2012

(86) PCT No.: PCT/EP2012/075208
§ 371 (c)(1),
(2) Date: Jun. 4, 2014

(87) PCT Pub. No.: WO2013/092337
PCT Pub. Date: Jun. 27, 2013

(65) Prior Publication Data
US 2014/0314654 A1    Oct. 23, 2014

(30) Foreign Application Priority Data
Dec. 21, 2011    (DE) ........................ 10 2011 089 449

(51) Int. Cl.
*C01B 33/029*    (2006.01)
*C01B 33/035*    (2006.01)
(52) U.S. Cl.
CPC ........... *C01B 33/029* (2013.01); *C01B 33/035* (2013.01); *Y10T 428/298* (2015.01); *Y10T 428/2978* (2015.01)

(58) Field of Classification Search
None
See application file for complete search history.

(56) References Cited

U.S. PATENT DOCUMENTS

| | | | |
|---|---|---|---|
| 6,309,467 B1 | 10/2001 | Wochner et al. | |
| 6,350,313 B2 | 2/2002 | Kraus et al. | |
| 7,105,053 B2 * | 9/2006 | Winterton | ............ C01B 33/035 117/75 |
| 7,927,571 B2 | 4/2011 | Altmann et al. | |
| 2007/0235574 A1 | 10/2007 | Schaefer et al. | |
| 2008/0286550 A1 | 11/2008 | Sofin et al. | |
| 2010/0001106 A1 | 1/2010 | Schaefer et al. | |
| 2010/0219380 A1 | 9/2010 | Hertlein et al. | |
| 2012/0052297 A1 | 3/2012 | Pech et al. | |
| 2012/0175613 A1 | 7/2012 | Netsu et al. | |

FOREIGN PATENT DOCUMENTS

| | | |
|---|---|---|
| DE | 102008040231 A1 | 12/2008 |
| EP | 0445036 A1 | 9/1991 |

(Continued)

OTHER PUBLICATIONS

English Translation of the Written Opinion of the International Search Authority. Jun. 21, 2014.*

*Primary Examiner* — Melvin C Mayes
*Assistant Examiner* — Michael Forrest
(74) *Attorney, Agent, or Firm* — Brooks Kushman P.C.

(57) ABSTRACT

Polycrystalline silicon rods produced by the Siemens process produce a higher yield of CZ crystals when the process parameters are modified in a second stage of deposition such that an outer layer of larger crystallites having a mean swize >20 μm is produced. Harvesting of these polycrystalline rods and conventional rods by enclosing them in a plastic bag or sheath prior to removal from the reactor also surprisingly increase the yield of CZ crystals grown from a melt containing the sheathed rods.

15 Claims, 1 Drawing Sheet

(56) References Cited

FOREIGN PATENT DOCUMENTS

| EP | 2157051 | A2 | 2/2010 |
| EP | 2423163 | B1 | 2/2012 |
| EP | 2479142 | A1 | 7/2012 |
| JP | 2004149324 | A | 5/2004 |
| WO | 2011/033712 | A1 | 3/2011 |

\* cited by examiner

A

B

POLYCRYSTALLINE SILICON ROD AND METHOD FOR PRODUCING POLYSILICON

CROSS-REFERENCE TO RELATED APPLICATIONS

This application is the U.S. National Phase of PCT Appln. No. PCT/EP2012/075208 filed Dec. 12, 2012, which claims priority to German Application No. 10 2011 089 449.7 filed Dec. 21, 2011, the disclosures of which are incorporated in their entirety by reference herein.

BACKGROUND OF THE INVENTION

1. Field of the Invention

The present invention relates to the preparation of polycrystalline silicon by chemical vapor deposition, e.g. by the Siemens process.

2. Description of the Related Art

Polycrystalline silicon (polysilicon for short) serves as a starting material for production of monocrystalline silicon for semiconductors by the Czochralski (CZ) or zone melting (FZ) process, and for production of mono- or polycrystalline silicon by various pulling and casting processes for production of solar cells for photovoltaics.

Polycrystalline silicon is generally produced by means of the Siemens process. In this process, in a bell jar-shaped reactor ("Siemens reactor"), support bodies, typically thin filament rods of silicon, are heated by direct passage of current and a reaction gas comprising hydrogen and one or more silicon-containing components is introduced. Typically, the silicon-containing component used is trichlorosilane ($SiHCl_3$, TCS) or a mixture of trichlorosilane with dichlorosilane ($SiH_2Cl_2$, DCS) and/or with tetrachlorosilane ($SiCl_4$, STC). Less commonly, but also on the industrial scale, silane ($SiH_4$) is used. The amount and composition of the reaction gas are set as a function of the time or rod diameter.

The filament rods are inserted vertically into electrodes at the reactor base, through which they are connected to the power supply. High-purity polysilicon is deposited on the heated filament rods and the horizontal bridge, as a result of which the diameter thereof grows with time.

The deposition process is typically controlled by the setting of rod temperature and reaction gas flow rate and composition. The rod temperature is measured with radiation pyrometers, usually on the surfaces of the rods facing the reactor wall. The rod temperature is set either in a fixed manner or as a function of rod diameter, by control or regulation of the electrical output.

After the attainment of a desired diameter, the deposition is ended and the polysilicon rods formed in this way are cooled to room temperature. After the rods have been cooled, the reactor bell jar is opened and the rods are removed manually or with the aid of specific devices, called deinstallation aids (see, for example, EP 2 157 051 A2), for further processing or for intermediate storage.

Both the storage and the further processing, particularly comminution of the rods, and classification and packaging of broken pieces, are generally effected under special environmental conditions in climate-controlled rooms, which prevents contamination of the product. Between the time of reactor opening and until introduction into storage or further processing, the material deposited, however, is exposed to environmental influences, particularly dust particles.

The morphology and microstructure of the growing rod are determined by the parameters of the deposition process.

Deposition with TCS or a mixture thereof with DCS and/or STC is typically effected at rod temperatures between 900 and 1100° C., with supply of silicon-containing component(s) (in total) of 0.5 to 10 kmol/h per 1 $m^2$ of rod surface area, where the molar proportion of this/these component(s) in the input gas stream (in total) is between 10% and 50% (the remaining 90% to 50% is typically hydrogen).

The figures given for rod temperature here and elsewhere relate (unless stated explicitly) to values which are measured in the vertical rod region at least 50 cm above the electrode and at least 50 cm below the bridge. In other regions, the temperature may differ distinctly therefrom. For example, significantly higher values are measured in the inner arc of the bridge, since the current flow is distributed differently in this region.

Polycrystalline silicon rods deposited under these conditions are matt gray and consist of crystallites having a mean size of 1 to about 20 μm. The crystallite size can be estimated, for example, by means of optical microscopy. Electron microscopy (SEM) allows three-dimensional scanning of almost every individual Si grain, which enables a more exact measurement of the mean crystallite size via a statistical evaluation.

Because of the very different shapes of the Si grains, the size thereof is typically determined by calculation from the area (for the conversion, the idealized round shape of the cross section is assumed).

Because of the significant surface curvature, particularly in the case of porous and fissured material, the measurement of roughness is generally not conducted over a traversing length Lt of 15 mm (as stipulated by DIN EN ISO 4288), but over the traversing length of 1.5 mm. This adapted method was employed in all the roughness measurements in the context of the invention.

In the case of deposition with silane, which is conducted at much lower temperatures (400-900° C.), flow rates (0.01 to 0.2 kmol/h of silane per 1 $m^2$ of rod surface area) and concentrations (0.5-2% silane in hydrogen), polysilicon rods consist of much smaller crystallites (0.01-0.5 μm). The surface of the rods is likewise matt gray and has roughness values Ra of 2.5-3.5 μm.

The morphology of the deposited rods may vary from compact and smooth (as described, for example, in U.S. Pat. No. 6,350,313 B2) up to very porous and fissured material (as described, for example, in US2010/219380 A1). The compact rods are more costly to produce, but often lead to better yields in subsequent crystallization steps.

Increasing the base parameters described above (temperature of the rods, specific flow rate, concentration) generally leads to an increase in the deposition rate and hence to an improvement in the economic viability for the deposition process. Each of these parameters, however, is subject to natural limits, exceedance of which disrupts the production process (according to the configuration of the reactor used, the limits are somewhat different).

If, for example, the concentration of the Si-containing component(s) selected is too high, there may be homogeneous gas phase deposition.

The effect of an excessively high rod temperature may be that the morphology of the silicon rods to be deposited does not become compact enough to provide a sufficient cross-sectional area for the current flow which rises with the growing rod diameter. If the current density becomes too high, this can cause silicon to melt.

In the case of rods of high diameter (from 120 mm upward), the choice of temperature is even more critical, since silicon in the rod interior, even in the case of compact morphology, can become liquid (because of the high temperature differentials between the surface and the rod center).

Customer demands on the product from the semiconductor and solar industries are also distinctly restricting the ranges for the process parameters. For example, for FZ applications, silicon rods that are very substantially free of cracks, pores, gaps, fissures, etc., and hence are homogeneous, dense and firm, are required. Moreover, these rods should preferably display an exceptional microstructure for a better yield in FZ pulling. A material of this kind and the process for production thereof are described, for example, in US2008/286550 A1.

For the production of recharging rods and what are called cut rods, which are used principally in the CZ process to increase the crucible fill level, likewise crack-free and low-tension raw polycrystalline silicon rods are required.

In the prior art, it is assumed that the microstructure of the polysilicon used is of no importance in CZ processes. In the mechanical manufacture of cut rods, FZ rods and recharging rods by means of sawing, the surface thereof is contaminated significantly. For this reason, these products generally then go through a cleaning step.

For most applications, polycrystalline silicon rods, however, are broken into small pieces, which are typically then classified by size. A process and a device for comminution and sorting of polysilicon are described, for example, in US 2007/235574 A1. In the processing to chunks, rods with cracks and further material defects are accepted as starting material. The microstructure of the polycrystalline rods is also not regarded as relevant in the prior art. The morphology of polycrystalline rods and of chunks formed therefrom, however, has a significant influence on the performance of the product.

Typically, a porous and fissured morphology has an adverse effect on the crystallization characteristics. This particularly affects the demanding CZ process, in which porous and fissured chunks were not usable because of the economically unacceptable yields.

Other crystallization processes (for example block casting, which is the most frequently used method for production of solar cells) are less sensitive to morphology. Here, the adverse effect of the porous and fissured material can be compensated for economically by the lower production costs thereof.

To improve the performance in downstream crystallization steps, silicon chunks formed in the comminution of silicon rods can be aftertreated. For example, the product quality can be increased by means of a cleaning step.

The cleaning, which is normally effected by wet-chemical means with one or more acids or acid mixtures (see, for example, U.S. Pat. No. 6,309,467 B1), is very inconvenient and costly, but generally improves the product properties. In the case of silicon chunks having porous or fissured morphology, the wet-chemical cleaning, however, cannot bring about any improvement in performance.

SUMMARY OF THE INVENTION

A problem addressed by the present invention was that of providing a novel inexpensive process for producing polycrystalline silicon, which alters the properties thereof such that a good pulling performance is enabled in downstream crystallization steps, especially in monocrystalline CZ applications. It would be particularly advantageous if the pulling performance of porous and fissured silicon rods or Si chunks formed therefrom is improved, because this material is the least expensive to produce. These and other problems addressed by the invention is solved by a polycrystalline silicon rod comprising an outer layer of polycrystalline silicon having a thickness of 0.01 to 20 mm, wherein said outer layer comprises crystallites having a mean size of more than 20 µm.

DETAILED DESCRIPTION OF THE PREFERRED EMBODIMENT

Figure 1:
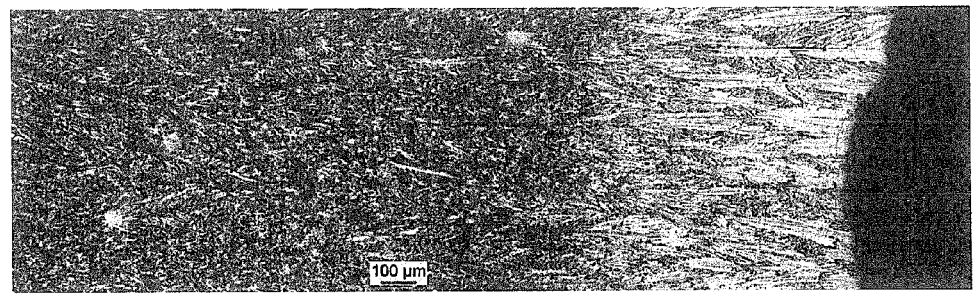
FIG. 1 shows the microstructure of an inventive rod (at right angles to the rod axis).

Preferably, the mean size of the crystallites of the outer layer is not more than 80 µm.

Preferably, the mean size of the crystallites of the outer layer is 25-60 µm, more preferably 30-60 µm, most preferably 35-55 µm.

Preferably, the polycrystalline silicon rod has a porous or fissured structure beneath the outer layer.

Preferably, the structure in the interior of the polycrystalline silicon rod is similar (thus, it has the same crystal structure, crystallite size etc. in the interior), comprising pores, gaps, clefts, cracks and fissures.

Preferably, the outer layer consists of crystallites having a mean size greater than the mean size of the crystallites beneath the outer layer. Preferably, the mean size of the crystallites beneath the outer layer is 1 µm to not more than 20 µm, more preferably 2-18 µm, and most preferably, 10-17 µm.

Preferably, the mean size of the crystallites of the outer layer is 25-80 µm and the mean size of the crystallites beneath the outer layer is 1-20 µm. More preferably, the mean size of the crystallites of the outer layer is 30-60 µm and the mean size of the crystallites beneath the outer layer is 1-25 µm.

Most preferably, the mean size of the crystallites of the outer layer is 35-55 µm and the mean size of the crystallites beneath the outer layer is 1-30 µm.

Preferably, the surface roughness is 4-10 µm, more preferably 5-8 µm.

The inventors have surprisingly and unexpectedly discovered that a change in the process parameters during a second step of the deposition leads to an improved product. The production of such a polycrystalline silicon rod envisages conducting the concluding part of the deposition process in the Siemens process, i.e. the second part of the deposition, under particular conditions.

Therefore, the problem addressed by the invention is also solved by a process for producing polysilicon by introducing a reaction gas comprising a silicon-containing component and hydrogen into a reactor, which results in deposition of polycrystalline silicon in the form of rods, characterized in that a temperature of the rods in a second step of the deposition is increased by at least 50° C. compared to a first step, where a concentration of the silicon-containing component in the reaction gas in the second step of the deposition is 5 mol % or less and a feed of the silicon-containing component is 0.25 mol per 1 $m^2$ of rod surface area or less.

Thus, the inventors have recognized that silicon rods and—after the comminution thereof—silicon chunks having advantageous properties for subsequent crystallization steps are the result when, in the last 0.1 to 50 hours, preferably 0.5 to 10 hours, of the deposition, which is effected with TCS or a mixture thereof with DCS and/or with STC, the process parameters in the second step are altered as follows:

the rod temperature is raised to preferably more than 1100° C., preferably to more than 1150° C., and by at least 50° C. as compared with the first step of the deposition, and the concentration of the silicon-containing component(s) (in total) is reduced to 5 mol % or less, preferably to 3 mol % or less, and the feed of the silicon-containing component(s) into the deposition reactor (in total) is reduced to 0.25 kmol/h per 1 m$^2$ of rod surface area or less, preferably to 0.1 kmol/h per 1 m$^2$ of rod surface area or less.

An outer layer which is formed under these conditions in the rods differs distinctly from the material in the rod interior and endows the product with favorable properties which have a positive effect on performance in subsequent crystallization steps.

This was surprising because it has been assumed to date in the prior art that the microstructure of the polycrystalline rods in the CZ process is unimportant. It was particularly surprising that even a thin surface layer of 0.01 to 20 mm with altered crystallite structure led to a distinctly better pulling performance.

The specific advantage of the invention is that the last layer having exceptional properties can also be applied to silicon rods having porous and fissured morphology, which have much lower production costs compared to the compact and smooth material. As a result, it is possible to use these rods, or silicon chunks which form in the breaking of inventive rods, in the subsequent crystallization without losses in yield and productivity.

This process according to the invention gives rise to polycrystalline silicon rods that are unknown as yet in the prior art. Their features include—as described above—an outer polycrystalline layer of thickness between 0.01 and 20 mm, preferably between 0.1 and 10 mm, most preferably between 0.1 and 5 mm, and a coarser microstructure compared to the inner deposited layers.

The polycrystalline silicon is preferably deposited onto filament rods of silicon heated by direct passage of current. A filament rod is formed from two vertical rods and one horizontal rod, the horizontal rod forming a connecting bridge between the vertical rods (=u-shaped support body).

The silicon-containing component used in the reaction gas is preferably TCS or a mixture of TCS and DCS or a mixture of TCS and STC.

Preferably, during the first step of the deposition, the passage of current through the filament rod is regulated such that the rod temperature is between 1000 and 1100° C. (at the same time, the temperature measured on the underside of the bridge is between 1300 and 1413° C.). The temperature of the reaction gases in the reactor is measured and adjusted such that it is at most 650° C., and the flow rate of the chlorosilane mixture is set to its maximum value within less than 30 hours, preferably within less than 5 hours, from commencement of the supply of the chlorosilane mixture.

FIG. 1 shows the microstructure of the outer region of the inventive polycrystalline silicon rod. In the right-hand part of FIG. 1, a distinctly coarser microstructure of the outer layer is visible compared to the rod interior (left). The thickness of the outer layer is about 0.8 mm. The outer layer is formed by microcrystallites having a mean size of 30 μm or more, preferably 50 μm or more. The roughness of the surface Ra (measured to DIN EN ISO 4288, but over the shorter traversing length of 1.5 mm) is 5 mm or more.

Figure 2:
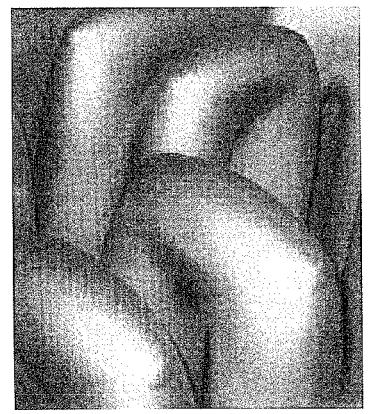
FIG. 2 shows a comparison of the surface of inventive rods (left, shiny) and rods according to the prior art (right, matt).
Figure 2:
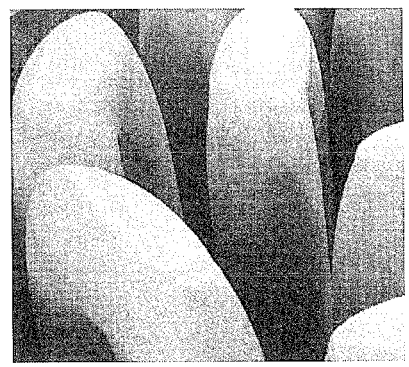

In addition, the inventive rods preferably differ from those from the prior art in that they are shiny. FIG. 2 shows the inventive shiny rods A as compared with the matt gray rods B from the prior art.

A further feature that distinguishes the inventive polycrystalline silicon rods from the rods known in the prior art is their behavior toward acids.

When a known silicon rod (or a chunk formed therefrom, containing the outer surface of the original rod) is immersed into a 1:1 mixture of 20 to 30% HNO$_3$ and 2 to 3% HF, the formation of hydrogen bubbles is observed (in the case of the chunk, at the surface that originates from the surface of the original rod, i.e. not at the fracture surface) after just 160 seconds, whereas it only commences in the case of the inventive rod after 180 seconds.

The novel process has no effect on the fracture characteristics. The inventive polysilicon rod containing an outer coarsely crystalline layer can be comminuted like a known rod lacking this layer, providing the same chunk size distribution, the same sphericity and the same width/length ratio of the chunks as a known polysilicon rod.

A deposition process in which the coarsely crystalline layer is obtained repeatedly by the above-described readjustment of the process parameters, and polysilicon rods having a kind of onion-peel structure are thus produced, is also possible. It was found, however, that this process can only improve the pulling performance in a subsequent crystallization step slightly as compared with rods having an outer layer.

Preferably, the "deinstallation" or "harvesting" of silicon rods from the reactor is effected after the deposition has ended while a stream of a contamination-free gas is passed around the rods. This prevents contact of the ambient air with the rods. The contamination-free gas used is preferably nitrogen or a noble gas. Preference is given to using nitrogen or argon. With regard to the procedure in the purging of the reactor or of the rods with inert gas and the detailed technical configuration, U.S. Pat. No. 7,927,571 is fully incorporated by reference.

Preferably, deposited silicon rod pairs or support bodies are covered with sacks prior to deinstallation. The sacks consist preferably of a polymer film, more preferably a polyethylene film. This particular procedure in the deinstallation of the rods from the deposition reactor can further improve the performance of the polysilicon rods or chunks formed therefrom in downstream crystallization steps.

Preferably, the silicon rods, after being harvested from the reactor, are comminuted into chunks, dedusted and optionally cleaned. The dedusting is preferably effected as described in applications having application reference numbers EP11178284.3 and U.S. Ser. No. 13/197,977, U.S. published application 2012/0052297, which were yet to be published at the priority date of the present application, and are fully incorporated here by reference.

The invention also relates to a process for producing polysilicon by introducing a reaction gas comprising a silicon-containing component and hydrogen into a reactor, which results in deposition of polycrystalline silicon in the form of rods, characterized in that, after the deposition has ended, a stream of a contamination-free gas is passed around the polycrystalline silicon rods, and they are covered with a plastic sack and removed from the reactor.

The deposition of the polysilicon is preferably effected on a U-shaped support body composed of silicon. During the deposition, the reactor is sealed airtight. The U-shaped support body is heated up by direct passage of current. The reaction gas is introduced into the reactor through a feed line, as a result of which silicon is deposited from the reaction gas on the u-shaped support body and the diameter thereof increases. The result is a polycrystalline u-shaped rod pair.

Offgas formed in the deposition is removed from the reactor by means of a removal line. When the deposition has ended—if the desired diameter has been attained—the support body or the rod pair is cooled to room temperature. The reactor is opened and the support body is removed from the reactor.

Commencing with the opening of the reactor until the removal of the support body or of the rod pair from the reactor, a contamination-free gas is conducted through the feed line and the removal line into the opened reactor. Preferably, the contamination-free gas used is nitrogen or a noble gas. Preference is given to using nitrogen or argon. This prevents contact of the ambient air with the rods. With regard to the procedure in the purging of the reactor or of the rods with inert gas and the detailed technical configuration, U.S. Pat. No. 7,927,571 is fully incorporated by reference.

In addition, the support body or the rod pair is covered with a sack made from a plastic before the deinstallation. Preferably, the sacks used consist of a polymer film or of a polyethylene film. This special procedure in the harvesting of the rods from the reactor can improve the performance of the polysilicon rods or chunks produced therefrom in subsequent crystallization steps, as shown by Example 5.

EXAMPLES

The invention is illustrated hereinafter by examples and comparative examples. For this purpose, polycrystalline silicon rods were produced by various deposition processes. Subsequently, the silicon rods produced were comminuted into chunks. These were ultimately used in a CZ pulling process. The pulling performance was assessed with reference to the yield, which shows what percentage by weight of the polycrystalline material used was convertible to a usable dislocation-free single crystal.

In all the tests listed below, single silicon crystals were pulled by the same CZ pulling process (crucible weight 90 kg, crystal diameter 8 inches, crystal orientation <100>, pulling speed 1 mm/h). When other pulling processes are employed, these different materials behave similarly relative to one another, although the absolute yield numbers may be different according to the difficulty of the pulling process.

Example 1

Comparative Example

Compact polycrystalline silicon rods were deposited according to the prior art. The corresponding process is known from US 2010/219380 A1. The conditions corresponded to those disclosed in Comparative example 1. The mean crystallite size in the material deposited was about 11 µm. The roughness of the surface Ra was 3.6 µm. Finally, the rods—as described in US2007/235574 A1—were broken into chunks. This was followed by a wet-chemical treatment of the chunks, as disclosed in US2010/001106 A1. When this material was used in the above-described pulling process, it was possible to achieve a mean yield of 95.4%.

Example 2

Comparative Example

Here too, compact polycrystalline silicon rods were deposited according to the prior art (cf. US 2010/219380 A1, Comparative example 1).

As in Example 1, the mean crystallite size in the material deposited was 11 µm and the roughness of the surface Ra was 3.6 µm. Subsequently, the rods were broken into silicon chunks by a low-contamination method and dedusted. There was no wet-chemical treatment. With this material, it was possible to achieve a yield of 90.8% in the pulling operation.

Example 3

Comparative Example

Here, porous and fissured polycrystalline silicon rods were deposited according to the prior art (cf. US 2010/219380 A1, Example 1). The mean crystallite size in the material deposited was about 16 µm and the roughness of the surface Ra was 4.1 µm. Subsequently, the rods were broken into silicon chunks by a low-contamination method and dedusted. With this material, it was possible to achieve a yield of only 67.3%.

Example 4

Comparative Example

In this example, porous and fissured polycrystalline silicon rods were deposited according to the prior art (as described in US 2010/219380 A1, Example 1). As in Example 3, the mean crystallite size in the deposited material was 16 µm and the roughness of the surface Ra was 4.1 µm. Subsequently, the rods, according to US2007/235574 A1, were broken into silicon chunks, which were cleaned by wet-chemical means according to DE102008040231 A1. In the pulling of this material, the mean yield was 68.1%.

Example 5

In this example, the procedure was as in Example 2, with the difference that, after the deposition, polysilicon rods were covered with polyethylene sacks and deinstalled from the deposition reactor under a nitrogen atmosphere. This alteration surprisingly increased the yield in the single-crystal pulling operation by 2.1% to 92.9%.

Example 6

In this example, compact polysilicon rods were deposited. The deposition proceeded up to the diameter of 149 mm as described in US 2010/219380 A1 Comparative example 1. Then the process parameters were altered as follows: the rod temperature was raised by 120° C. to 1150° C., the TCS feed was lowered to 0.05 kmol/h per 1 m$^2$ of rod surface area and the TCS concentration to 4 mol %. These process parameters were maintained until the rods had attained the diameter of 150 mm.

The inventive rods obtained were shiny and had an outer layer of thickness 0.5 mm with a distinctly coarser microstructure. The mean crystallite size in the rod interior was 11 µm, and in the outer layer was 37 µm. The roughness of the rod surface had an Ra value of 5.1 µm.

Subsequently, the rods were broken into silicon chunks by a low-contamination method and dedusted. With this inventive material, it was possible to achieve a yield of 95.2% in the pulling operation.

Example 7

In this example, porous and fissured polycrystalline silicon rods were deposited. The deposition proceeded as far as 148 mm essentially as described in US 2010/219380 A1, Example 1. The rod temperature was 1075° C. At the same time, the temperature measured on the underside of the bridge as described therein was 1300 to 1413° C.

Then, the process parameters were altered as follows: the rod temperature was raised by 125° C. to 1200° C., the feed of the TCS/DCS mixture was lowered to 0.03 kmol/h per 1 $m^2$ of rod surface area and the TCS/DCS concentration to 3 mol %. These process parameters were maintained until the rods had attained the diameter of 150 mm.

The inventive rods obtained were shiny gray and had an outer layer of thickness 1.0 mm having a distinctly coarser microstructure. The mean crystallite size in the rod interior was 16 μm, and in the outer layer was 52 μm.

The roughness of the rod surface had an Ra value of 5.6 μm.

Subsequently, the rods were broken into silicon chunks by a low-contamination method and dedusted. With this inventive material, it was possible to achieve a yield of 93.2% in the pulling operation.

The invention claimed is:

1. A polycrystalline silicon rod comprising an outer layer of polycrystalline silicon having a thickness of 0.01 to 20 mm, the outer layer comprising crystallites having a mean size of more than 20 μm.

2. The polycrystalline silicon rod of claim 1, wherein the outer layer has a surface roughness of 4-10 μm.

3. The polycrystalline silicon rod of claim 1, which has a shiny surface.

4. The polycrystalline silicon rod of claim 1, which has, beneath the outer layer, a structure comprising pores, gaps, clefts, cracks and fissures.

5. A process for the production of polycrystalline silicon chunks, comprising comminuting a polycrystalline silicon rod of claim 1.

6. Polycrystalline silicon chunks produced by the process of claim 5.

7. A process for producing polycrystalline silicon rods of claim 1, comprising:
   introducing a reaction gas comprising a silicon-containing component and hydrogen into a reactor and depositing polycrystalline silicon in the form of rods in at least two steps, wherein in a second step, the temperature of the rods during deposition is increased by at least 50° C. compared to the temperature in a first step, where a concentration of the silicon-containing component in the reaction gas in the second step is 5 mol % or less and a feed of the silicon-containing component is 0.25 mol or less per 1 $m^2$ of rod surface area, such that the polycrystalline rods produced comprise an outer layer having a thickness of 0.01 to 20 mm, the outer layer comprising crystallites having a mean size of more than 20 μm.

8. The process of claim 7, wherein after deposition of the polycrystalline silicon, a stream of a contamination-free gas is passed around the rods while they are being removed from the reactor.

9. The process of claim 7, wherein after deposition of the polycrystalline silicon, the rods are covered with a sack before they are removed from the reactor.

10. The process of claim 7, wherein the rod temperature during the second step of the deposition is at least 1100° C.

11. The process of claim 7, wherein the duration of the second step of the deposition is 0.1 to 50 hours.

12. The process of claim 7, wherein the silicon rods after the deposition are comminuted into chunks and dedusted.

13. The process of claim 9, wherein the sack comprises a polymer film.

14. The process of claim 9, wherein the sack comprises a polyethylene film.

15. The process as claimed in claim 8, wherein the contamination-free gas used is nitrogen, a noble gas, or mixture thereof.

* * * * *